United States Patent [19]
Kappele

[11] Patent Number: 5,143,547
[45] Date of Patent: Sep. 1, 1992

[54] SPECIFIC DYE SET FOR THERMAL INK-JET PRINTING ON PLAIN AND COATED PAPERS

[75] Inventor: William D. Kappele, Loveland, Colo.

[73] Assignee: Hewlett-Packard Company, Palo Alto, Calif.

[21] Appl. No.: 749,740

[22] Filed: Aug. 26, 1991

[51] Int. Cl.⁵ .............................. C09D 11/02
[52] U.S. Cl. ................................ 106/22; 106/20
[58] Field of Search .............. 106/20, 23, 22

[56] References Cited

U.S. PATENT DOCUMENTS

| | | | |
|---|---|---|---|
| 4,500,355 | 2/1985 | Shimada et al. | 106/20 |
| 4,685,968 | 8/1987 | Palmer | 106/22 |
| 4,761,180 | 8/1988 | Askeland et al. | 106/22 |
| 4,810,292 | 3/1989 | Palmer et al. | 106/22 |
| 4,818,285 | 4/1989 | Causley et al. | 106/22 |
| 4,994,110 | 2/1991 | Stoffel et al. | 106/22 |
| 5,017,227 | 5/1991 | Koike et al. | 106/22 |

Primary Examiner—William R. Dixon, Jr.
Assistant Examiner—Helene Klemanski

[57] ABSTRACT

A specific dye set, comprising Acid Yellow 23, Direct Red 227, and Acid Blue 9, yields true, vivid colors on specially coated paper and transparency, and yields true colors on uncoated or "plain" papers. This dye set, which is intended for 300 dpi thermal ink-jet printers, is a distinct improvement over a prior art dye set.

4 Claims, 2 Drawing Sheets

SPECIFIC DYE SET FOR THERMAL INK-JET PRINTING ON PLAIN AND COATED PAPERS

CROSS-REFERENCE TO RELATED APPLICATION

The present application is related to two patent applications, Ser. Nos. 07/737,945 (Prasad) and 07/757,941, now U.S. Pat. No. 5,108,504 (Johnson et al), both filed Jul. 29, 1991, and both commonly owned by the same assignee as the present application.

TECHNICAL FIELD

The present invention relates to thermal ink-jet printing, and, in particular, to a specific dye set suitable for use with plain and coated papers.

BACKGROUND ART

In a commercially available thermal ink-jet printer, yellow, magenta, and cyan colors are provided by inks containing Direct Yellow 86, Acid Red 52, and Acid Blue 9 dyes, respectively. However, this dye set has been observed to yield a rather limited color gamut, that is, a smaller number of colors, on plain paper, although its use with specially coated papers provides high quality color prints.

It is desirable to provide a dye set that can be interchangeably used with coated papers, plain papers, and transparencies to provide vivid, true colors.

DISCLOSURE OF INVENTION

In accordance with the invention, a specific dye set, comprising Acid Yellow 23, Direct Red 227, and Acid Blue 9 yields true, vivid colors on specially coated paper and transparency film. It also yields true colors on uncoated or "plain" papers. The color print quality on each of these media is superior to the prior art dye set. Specifically, the dye set of the invention provides colors with higher Munsell chroma (more vivid colors) and more correct Munsell hue (truer colors) than the dye set of the prior art.

BEST MODES FOR CARRYING OUT THE INVENTION

Figure 1:
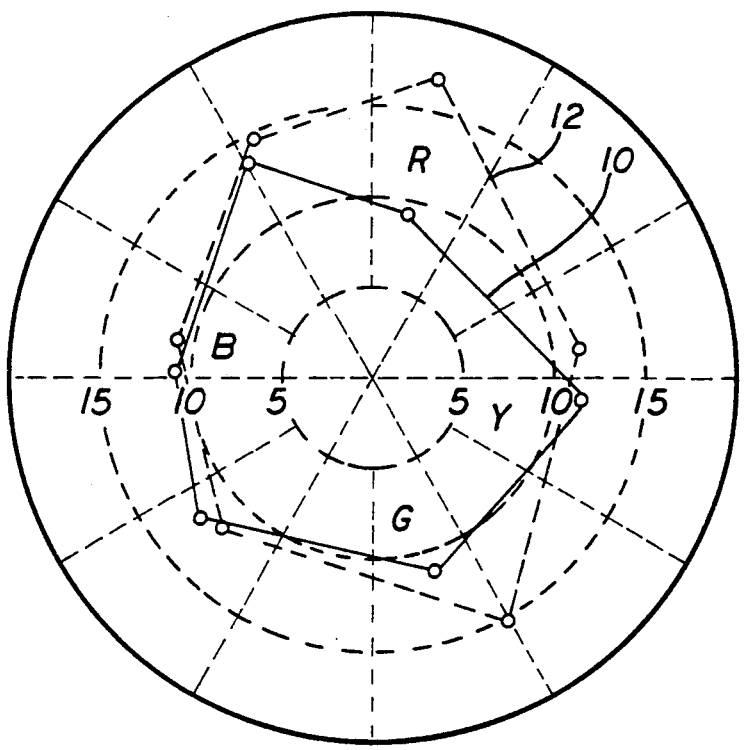
FIG. 1 is a color gamut comparison on Munsell coordinates, comparing the dye set of the invention with the dye set of the prior art on transparency film.

The following invention is directed to a specific dye set for use with a 300 dot-per-inch (dpi) thermal ink-jet printer. It provides superior results to commercially-available 180 DPI thermal ink-jet printers.

The dye set of the invention comprises inks containing Acid Yellow 23, Direct Red 227, and Acid Blue 9. It is often desirable to replace the cation with which the dye is associated (usually, sodium) in order to optimize the performance of the ink for a particular ink-jet printhead. However, it should be noted that the particular ionic form is irrelevant to the practice of the invention.

For use with a 300 dpi printhead, the yellow and magenta dyes are first treated to replace the as-supplied sodium counter-ion on the dye with tetramethylammonium cation. This is to prevent crusting of the printhead nozzles by the ink.

Acid Yellow 23-Na is purified and ion-exchanged to the tetramethylammonium (TMA) form simultaneously by the method described in U.S. Pat. No. 4,685,968. The use of the TMA cation is described in U.S. Pat. No. 4,761,180. The process of forming the TMA form of the dye and its composition are thus known in the art and form no part of this invention.

The Acid Yellow 23-TMA dye is then mixed with deionized (DI) water, diethylene glycol, and a bactericide in the following proportions:

| | |
|---|---|
| Acid Yellow 23-TMA | about 0.5 to 5 wt %; |
| diethylene glycol | about 5 to 15 wt %; |
| bactericide | about 0.1 to 1.0 wt %; and |
| water | balance. |

Preferably, the amount of Acid Yellow 23-TMA dye is about 1.2 wt % for a 300 dpi printhead and the amount of diethylene glycol is 5.5 wt %.

The bactericide may be any of the well-known bactericides employed in thermal ink-jet inks, such as 0.5 wt % NUOSEPT 95, available from Hüls America (Piscataway, N.J.), 0.1 wt % PROXEL CRL, available from ICI Americas (Wilmington, Del.), and 0.5 wt % glutaraldehyde, available from Aldrich Chemical (Milwaukee, Wis.).

The ink (1.2 wt % dye) made above has the following properties:

| | |
|---|---|
| surface tension | 67.9 dyne/cm |
| density | 1010 g/l |
| conductivity | 4.02 mmho/cm |
| viscosity | 1.33 cp |
| Lambda maximum | 426 nm |
| dilution factor | 5000 |
| absorbance | 0.1450. |

Direct Red 227-Na is processed as described above to replace the sodium cations with TMA cations. The ink made from this dye has the following formulation:

| | |
|---|---|
| Direct Red 227-TMA | about 0.5 to 5 wt %; |
| diethylene glycol | about 5 to 15 wt %; |
| bactericide | about 0.1 to 1.0 wt %; and |
| water | balance. |

Preferably, the amount of Direct Red 227-TMA is about 3.0 wt % for a 300 dpi printhead and the amount of diethylene glycol is about 5.5 wt %.

The ink (3.0 wt % dye) made above has the following properties:

| | |
|---|---|
| surface tension | 65.5 dyne/cm |
| density | 1015 g/l |
| conductivity | 4.30 mmho/cm |
| viscosity | 1.56 cp |
| Lambda maximum | 540 nm |
| dilution factor | 5000 |
| absorbance | 0.1895. |

Acid Blue 9-Na is purified as above and the dye concentrate is mixed with DI water, diethylene glycol, and a bactericide to form an ink having the formulation

| | |
|---|---|
| Acid Blue 9-Na | about 0.5 to 5.0 wt %; |
| diethylene glycol | about 5 to 15 wt %; |
| bactericide | about 0.1 to 1.0 wt %; and |
| water | balance. |

Preferably, the amount of Acid Blue 9-Na is about 1.5 wt % for a 300 dpi printhead and the amount of diethylene glycol is about 5.5 wt %.

The ink (1.5 wt % dye) made above has the following properties:

| | | |
|---|---|---|
| surface tension | 65.6 | dyne/cm |
| density | 1010 | g/l |
| conductivity | 2.45 | mmho/cm |
| viscosity | 1.34 | cp |
| Lambda maximum | 630 | nm |
| dilution factor | 5000 | |
| absorbance | 0.4650. | |

Using the inks from above on a 300 dpi thermal ink-jet printer, various media were printed on, including plain paper, specially coated paper, and transparency.

FIG. 1 shows the color gamut comparison on Munsell coordinates (for printing on transparencies) for the dye set of the prior art (Curve 10) and for the dye set of the invention (Curve 12). The radius measures chroma. It is readily seen that the dye set of the invention can reproduce a larger number of colors. The inks of the invention show a significant improvement in the red (R) and green (G) regions, with comparable performance elsewhere. In this and in the remaining Figures, Y is yellow and B is blue.

Figure 2:
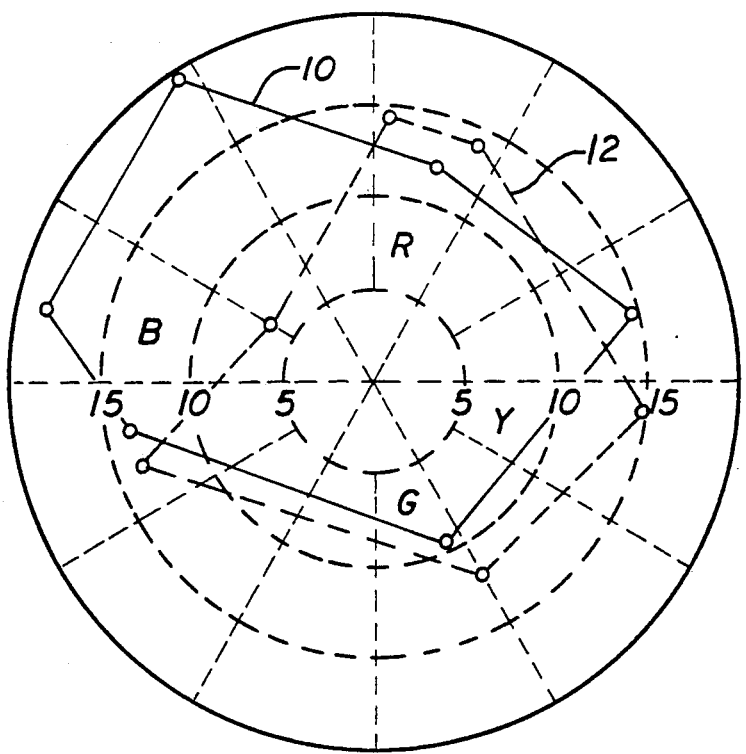
FIG. 2 is a similar plot as FIG. 1, but on special paper.
Figure 3:
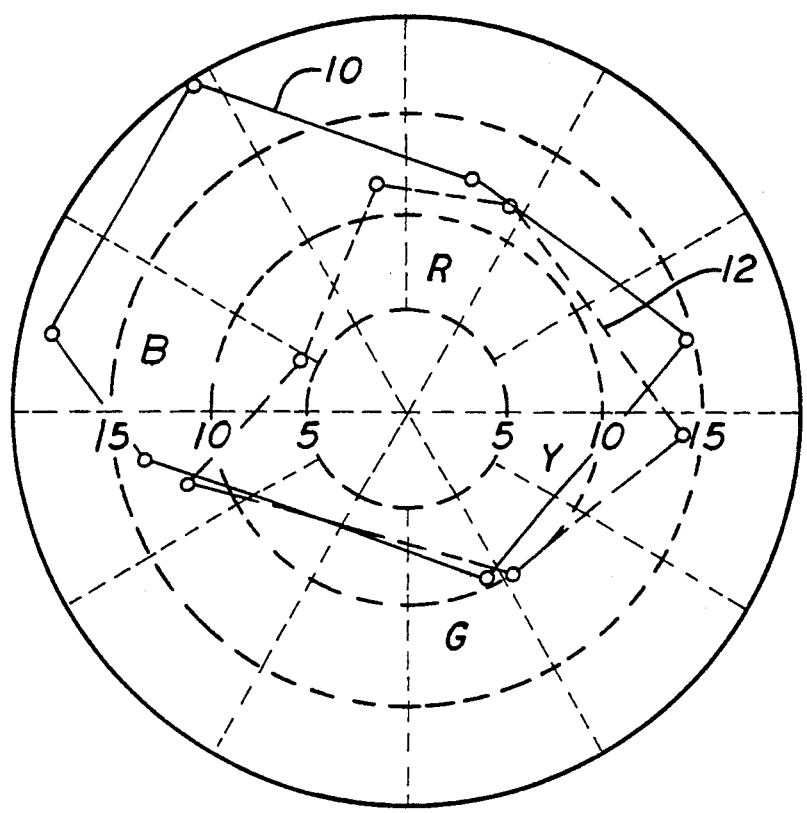
FIG. 3 is a similar plot as FIG. 1, but on plain paper.

FIGS. 2 and 3 are similar plots as FIG. 1, but showing printing on special coated paper (FIG. 2) and on plain paper (FIG. 3).

With regard to special coated paper, the inks of the invention have a lower chroma in the purple and red purple regions. Fortunately, people are less sensitive to chroma in these regions. They find a "dark" or "navy" blue very acceptable. People are more sensitive to the red and green regions, and the inks of the invention have higher chroma in these regions.

With regard to plain paper, the inks of the invention also have lower chroma in the purple and red purple regions, and the comments above relating to special coated paper apply here as well. In the red and green regions, the inks are comparable to the prior art inks. Since the PaintJet printer uses special paper, direct comparison to plain paper is not possible.

The dye set of the invention is intended for use on 300 dpi thermal ink-jet printers, and will not work on lower resolution printers, such as 180 DPI printers. This is due to the requirement that the dye concentrations in a 180 dpi system needs to be higher than for a 300 dpi system to achieve the same color saturation (e.g., amount of dye per unit area). Indeed, the magenta dye concentration must be so high for Direct Red 227 that severe start-up problems occur.

INDUSTRIAL APPLICABILITY

The specific dye set disclosed herein is expected to find commercial use in thermal ink-jet printers having at least 300 dpi capability.

What is claimed is:

1. A dye set for use with thermal ink-jet printers having at least 300 dpi print capability consisting essentially of Acid Yellow 23, Direct Red 227, and Acid Blue 9.

2. The dye set of claim 1 wherein Acid Yellow 23 and Direct Red 227 dye molecules are associated with tetramethylammonium cations.

3. A set of inks containing yellow, magenta, and cyan dyes for thermal ink-jet printers having at least 300 dpi print capability, said yellow ink having the formula

| | |
|---|---|
| Acid Yellow 23 | about 0.5 to 5.0 wt % |
| diethylene glycol | about 5 to 15 wt % |
| bactericide | about 0.1 to 1.0 wt % |
| water | balance, | said magenta ink having the formula

| | |
|---|---|
| Direct Red 227 | about 0.5 to 5.0 wt % |
| diethylene glycol | about 5 to 15 wt % |
| bactericide | about 0.1 to 1.0 wt % |
| water | balance, and | said cyan ink having the formula

| | |
|---|---|
| Acid Blue 9 | about 0.5 to 5.0 wt % |
| diethylene glycol | about 5 to 15 wt % |
| bactericide | about 0.1 to 1.0 wt % |
| water | balance. |

4. A set of inks of claim 3, said yellow ink having the formula

| | |
|---|---|
| Acid Yellow 23-TMA | about 1.2 wt % |
| diethylene glycol | about 5.5 wt % |
| bactericide | about 0.1 to 1.0 wt % |
| water | balance, | said magenta ink having the formula

| | |
|---|---|
| Direct Red 227-TMA | about 3.0 wt % |
| diethylene glycol | about 5.5 wt % |
| bactericide | about 0.1 to 1.0 wt % |
| water | balance, and | said cyan ink having the formula

| | |
|---|---|
| Acid Blue 9-Na | about 1.5 wt % |
| diethylene glycol | about 5.5 wt % |
| bactericide | about 0.1 to 1.0 wt % |
| water | balance, | where TMA indicates the tetramethylammonium cation associated therewith and Na indicates the sodium cation associated therewith.

* * * * *